Nov. 13, 1951     H. G. WOODBURN     2,574,679
KITCHEN UTENSIL
Filed March 22, 1947

INVENTOR.
Harold G. Woodburn
BY Robert U. Geib, Jr.
HIS ATTORNEY

Patented Nov. 13, 1951

2,574,679

UNITED STATES PATENT OFFICE 2,574,679

KITCHEN UTENSIL

Harold G. Woodburn, Munhall, Pa.

Application March 22, 1947, Serial No. 736,569

1 Claim. (Cl. 30—142)

This invention relates to kitchen utensils, and more particularly to a spoon-like implement which has a wide variety of uses.

It is among the objects of the present invention to provide a kitchen utensil of the class described which is capable of such a wide variety of uses as to take the place of the usually necessary relatively large number of individual implements.

Another object is to provide a kitchen utensil comprising a spoon-like implement providing a ladle, together with a triangular-shaped flat bottom portion which may be utilized to press flour, etc., in the making of gravy, and substantially straight and sharp front and side edged portions which function as scrapers.

Still another object is the attainment of the foregoing advantages together with the provision of a handle portion which will permit the utensil to normally rest upon a flat surface in such a manner that the spoon-shaped rearward portion will not spill its contents.

A further object is the attainment of the foregoing objects while providing side edges which are turned upwardly with respect to the bottom portion to thereby contribute to the function of the spoon portion and yet not of sufficient height as to preclude the use of the utensil as a spatula for the turning of pancakes, fried eggs, and the like.

These and other objects will be apparent from the following specification when taken with the accompanying drawing in which.

Figure 1:
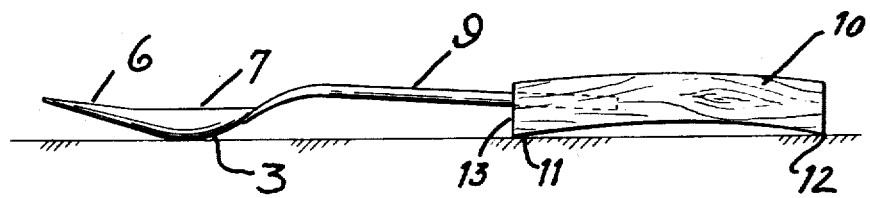
Figure 1 is a longitudinal elevation of the spoon-like implement of the present invention.
Figure 2:
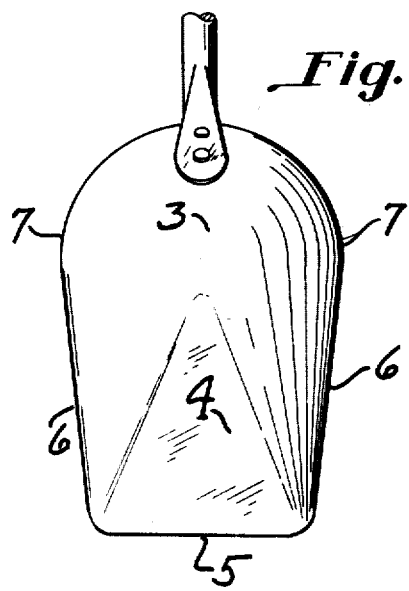
Figure 2 is a fragmentary enlarged elevation illustrating the bottom of the implement of Figure 1.
Figure 3:
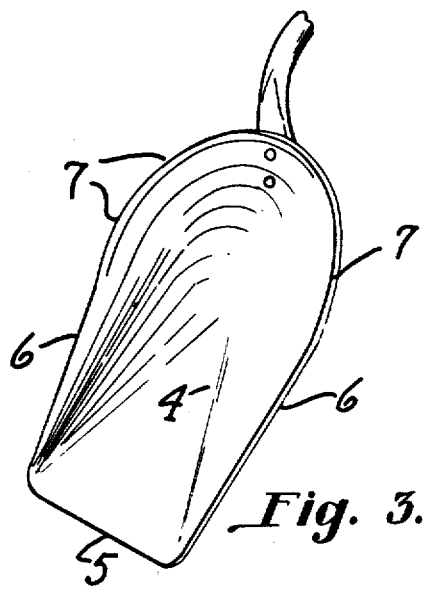
Figure 3 is a fragmentary perspective of the implement illustrating the inside or top portion.

Referring more particularly to the drawings, the spoon-like kitchen utensil of the present invention comprises a body portion of which the rearward portion thereof forms a bowl 3 in the manner of a conventional spoon. As most clearly shown in Figures 2 and 3, the bowl 3 merges into a triangular-shaped flat bottom portion 4, the forward end of which is straight as shown at 5. The side edges of the utensil or implement are turned upwardly and provide straight portions 6 which, when viewed in side elevation, are substantially coextensive with the length of the triangular-shaped bottom portion 4 and which assume an inclination with respect to the horizontal when the said implement is lying flat on a horizontal surface as shown in Figure 2. The side edges 6 connect with rearwardly extending side edges 7 which, when viewed in side elevation, are likewise straight but which are substantially horizontal when the implement is placed in the position of Figure 1.

Figure 4:
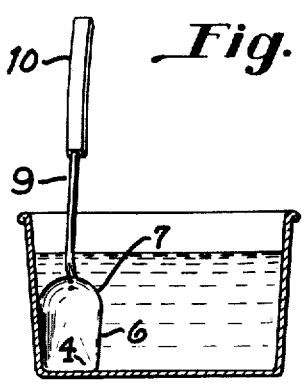
Figure 4 is a sectional elevation of a vessel, such as a cooking vessel, and illustrating the manner in which the spoon-like implement may be employed to clean the same.

The straight front edge 5 of the triangular-shaped flat bottom portion 4, and also the upwardly turned side edges 6 which are substantially coextensive with the length of the triangular-shaped flat bottom portion are sharp and provide highly efficient scraping edges. I have found that when working with metal of acceptable gauge the simple stamping operation required to shape the body portion of the utensil of the invention partially rotates the front edge 5 and the upwardly turned side edges 6 to an extent sufficient to provide edges which will properly function as scrapers, thus obviating a grinding or other sharpening operation. As most clearly shown in Figure 2, the side edges 6 and 7 extend rearwardly in slightly divergent manner. When the connecting side edges 6 and 7 of the implement are properly adjusted with respect to its axis and held in such adjusted position against axial rotation, the said side edges of the implement may be made to provide continuous contact with a substantial height of the side walls of a cooking vessel (for example) while at the same time permitting the straight edge 5 to contact the bottom thereof; all as shown in Figure 4 of the drawing.

It will be perceived that the upwardly turned side edges 6 which are substantially coextensive with the triangular-shaped flat bottom portion 4, are quite shallow and therefore do not preclude the use of the utensil of the invention as a spatula as in the turning of pancakes, fried eggs, etc.

The handle 9 of the implement may be integrally formed or may be attached to the back of the spoon-shaped rearward or bowl portion 3 in any suitable manner as by riveting, spot welding, etc.

According to a preferred embodiment, the handle 9 is provided at its outer end with a curvilinear hand-grip portion 10 which is substantially rectangular in cross-section or at least provides a transversely straight edge 11 at its forward extremity and a corresponding straight edge 12 at its rearward extremity. The function of these transversely straight edges 11 and 12 is to permit the same to simultaneously contact a flat surface upon which the implement may be resting (as in Figure 1) while the side edges 7 are in substantially horizontal position and the bowl 3 is in maximum contents-retaining position. This feature is to be distinguished from the conventional kitchen or baking spoon which is so constructed that when placed on a flat surface it will roll over to one side or the other and spill its contents. In addition, the hand-grip portion 10 terminates at its forwarding end in a flat abutment 13 which serves as a stop to prevent the further movement of the implement down into a large vessel or the like.

While I have shown and described one specific embodiment of my invention, it will be understood that I do not wish to be limited exactly thereto, since various modifications may be made without departing from the scope of my invention as defined in the following claim.

I claim:

A spoon-like kitchen utensil comprising a bowl portion having a concavo-convex shape; said bowl portion merging into a substantially flat triangular portion extending forwardly of said bowl portion, the base of said flat triangular portion forming a forward edge for said utensil normal to the axis of said utensil, said substantially flat triangular portion provided with laterally extending, relatively narrow, forwardly tapering sides which are a continuation of the sides of said bowl portion and form a substantially straight edge therewith in plan, the forward end of each of said forwardly tapering sides substantially merging into the plane of said flat triangular portion, said last-named sides in elevation being substantially straight and merging with said bowl sides at an obtuse angle to thereby enable the substantially flat portion of said utensil to be effectively inserted between a relatively flat food article and its support; and a handle attached to and extending rearwardly of said bowl portion, and adapted to support said bowl portion in a substantially horizontal position when said utensil is placed on a horizontal surface, said handle having a portion thereof of a width sufficient to prevent ready tilting of said bowl when said utensil is disposed on a horiozntal surface.

HAROLD G. WOODBURN.

REFERENCES CITED

The following references are of record in the file of this patent:

UNITED STATES PATENTS

| Number | Name | Date |
|---|---|---|
| 261,615 | Jope | July 25, 1882 |
| 339,514 | Averill | Apr. 6, 1886 |
| 1,619,878 | Morgan et al. | Mar. 8, 1927 |
| 1,984,081 | Pisculli | Dec. 11, 1934 |
| 2,045,192 | Kuhar | June 23, 1936 |

Certificate of Correction

Patent No. 2,574,679            November 13, 1951

HAROLD G. WOODBURN

It is hereby certified that error appears in the printed specification of the above numbered patent requiring correction as follows:

Column 2, line 27, after the numeral "7" insert , *when viewed in side elevation*, ;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.* at its rearward extremity. The function of these transversely straight edges 11 and 12 is to permit the same to simultaneously contact a flat surface upon which the implement may be resting (as in Figure 1) while the side edges 7 are in substantially horizontal position and the bowl 3 is in maximum contents-retaining position. This feature is to be distinguished from the conventional kitchen or baking spoon which is so constructed that when placed on a flat surface it will roll over to one side or the other and spill its contents. In addition, the hand-grip portion 10 terminates at its forwarding end in a flat abutment 13 which serves as a stop to prevent the further movement of the implement down into a large vessel or the like.

While I have shown and described one specific embodiment of my invention, it will be understood that I do not wish to be limited exactly thereto, since various modifications may be made without departing from the scope of my invention as defined in the following claim.

I claim:

A spoon-like kitchen utensil comprising a bowl portion having a concavo-convex shape; said bowl portion merging into a substantially flat triangular portion extending forwardly of said bowl portion, the base of said flat triangular portion forming a forward edge for said utensil normal to the axis of said utensil, said substantially flat triangular portion provided with laterally extending, relatively narrow, forwardly tapering sides which are a continuation of the sides of said bowl portion and form a substantially straight edge therewith in plan, the forward end of each of said forwardly tapering sides substantially merging into the plane of said flat triangular portion, said last-named sides in elevation being substantially straight and merging with said bowl sides at an obtuse angle to thereby enable the substantially flat portion of said utensil to be effectively inserted between a relatively flat food article and its support; and a handle attached to and extending rearwardly of said bowl portion, and adapted to support said bowl portion in a substantially horizontal position when said utensil is placed on a horizontal surface, said handle having a portion thereof of a width sufficient to prevent ready tilting of said bowl when said utensil is disposed on a horiozntal surface.

HAROLD G. WOODBURN.

REFERENCES CITED

The following references are of record in the file of this patent:

UNITED STATES PATENTS

| Number | Name | Date |
|---|---|---|
| 261,615 | Jope | July 25, 1882 |
| 339,514 | Averill | Apr. 6, 1886 |
| 1,619,878 | Morgan et al. | Mar. 8, 1927 |
| 1,984,081 | Pisculli | Dec. 11, 1934 |
| 2,045,192 | Kuhar | June 23, 1936 |

Certificate of Correction

Patent No. 2,574,679

November 13, 1951

HAROLD G. WOODBURN

It is hereby certified that error appears in the printed specification of the above numbered patent requiring correction as follows:

Column 2, line 27, after the numeral "7" insert , *when viewed in side elevation*, ;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*

Certificate of Correction

Patent No. 2,574,679 November 13, 1951

HAROLD G. WOODBURN

It is hereby certified that error appears in the printed specification of the above numbered patent requiring correction as follows:

Column 2, line 27, after the numeral "7" insert , *when viewed in side elevation,* ;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*